United States Patent Office 3,487,033
Patented Dec. 30, 1969

3,487,033
SINGLE UNGELATINIZED STARCH-COMPONENT-CORRUGATING ADHESIVE
Donald E. McElmury, Matteson, and August C. Fischer, Jr., Lemont, Ill., assignors to Corn Products Company, a corporation of Delaware
No Drawing. Filed Oct. 4, 1967, Ser. No. 672,691
Int. Cl. C08b 25/02, 27/52; C13l 1/00
U.S. Cl. 260—17.3                                23 Claims

ABSTRACT OF THE DISCLOSURE

The present invention relates to a starch corrugating adhesive preparation which when used in the preparation of corrugated board provides water-resistance to the corrugated board. The starch adhesive is prepared from a single ungelatinized starch component by reaction of the ungelatinized starch in alkali and water in specified proportions and under heat conditions to provide a suspension of starch containing primarily ungelatinized starch in partially swollen form. The reaction is terminated and the gel point of the starch mixture is adjusted to between 135° F. and 160° F.

Either prior to the treatment of the starch as above, during the treatment or subsequent thereto, a resin component is added in an amount between 2 parts and 25 parts by weight, dry basis, for every 100 parts of starch solids. The resin component is selected from the group consisting of urea-formaldehyde resin and melamine formaldehyde resin.

---

The present invention relates to an improved starch adhesive suitable for preparing corrugated paperboard. More particularly, the present invention relates to the preparation of a single ungelatinized starch component adhesive in combination with a resin component to provide a simple starch corrugating adhesive which will lend water-resistant characteristics to corrugated board.

Corrugated paperboard presently is manufactured in a continuous operation involving several steps. A strip of paper, slightly moistened, is passed through heated flute rolls. To one side of the heated fluted paper, adhesive is applied to the tip edge of each flute. Immediately thereafter, a strip of liner paper is brought into contact with the adhesive treated flutes of the corrugated paper in the presence of heat and pressure resulting in the formation of a strong adhesive bond. This product is known in the art as "single facer" corrugated paperboard.

Another type of corrugated paperboard is the "double backer." The double backer is prepared by applying adhesive to the exposed flutes of the single facer board and bonding a second liner to the adhesive tipped flute. The application of the second liner is different from that of the first liner because less pressure can be applied during the setting and bonding of the adhesive lest the corrugated strip be crushed.

Corrugated paperboards are prepared at machine speeds up to at least 700 feet per minute. Such instantaneous adhesive bonding indeed requires a very special adhesive. The adhesive must be sufficiently viscous to remain in position on the tip of the flutes when applied and to fill any depressions inherently possessed by the paper. In addition, it must be capable of "instant bonding" when heat and light pressure are applied since, at present machine speeds, even a double backer corrugated paperboard is formed entirely in less than one minute.

Starch adhesives are presently being used in the corrugating industry; however, such adhesives are all two component starch adhesives requiring special mixing machines and holding vessels. The two starch components consist of a carrier starch portion and a raw starch portion. The carrier portion contains gelatinized starch which when mixed with the raw (ungelatinized) starch portion, acts as a carrier or suspending agent for the ungelatinized starch. The strength of a starch adhesive bond in the corrugating industry is dependent upon primarily the swelling and subsequent gelatinization of the ungelatinized starch portion. Thus, it is highly desirable to use a starch formulation wherein the starch is substantially completely in ungelatinized form.

It is even more difficult to provide a two starch component corrugating adhesive which when used to prepare corrugated board lends water-resistant characteristics to the board. Previously, when preparing a water-resistant two starch component corrugating adhesive, it has been necessary to substantially decrease the borax content when using a water-resistant component such as urea-formaldehyde or melamine formaldehyde resins. It is generally known that the addition of either of these resins or a combination of them, to a starch containing adhesive in the presence of borax will cause a substantial increase in viscosity of the corrugating adhesive. Such increase in viscosity is difficult to control and may require variation of the formulation or use of more expensive equipment to control the viscosity. In the two component starch corrugating adhesives substantial reduction of the borax may allow the proper control of viscosity; however, the reduction of the borax results in lowering of the effectiveness and bonding characteristics of the adhesive.

It is an object of the present invention to provide a corrugating adhesive formulation which upon use provides water-resistant characteristics to corrugated board and which may be used for single facer corrugated board and double backer corrugated board without required change in formula.

It is another object of the present invention to provide a process for preparing a water-resistant corrugating adhesive comprising ungelatinized starch, thermal-chemically treated to act as its own carrier and a resin component such that borax may be retained in the formula.

It is still another object of the present invention to provide a water-resistant corrugating adhesive which is simple to prepare, uniform and homogeneous in character and which may be prepared in a single mix system.

It is a further object of the present invention to provide a corrugating adhesive having improved water holding properties as well as satisfactory water-resistant properties.

Yet another object of the present invention is to provide a corrugating adhesive exhibiting suitable water-resistant characteristics and having improved viscosity stability.

A further object of the present invention is to provide a method for preparing a starch-containing water-resistant corrugating adhesive which eliminates need for cooking and as a result requires only simple and low-cost equipment.

It is a still further object of the present invention to provide a method for preparing an improved water-resistant corrugating adhesive in a shortened preparation time.

A specific object of the present invention is to provide corrugated paperboard having superior bonding and water-resistant characteristics.

Other objects and advantages of the present invention will be obvious to those skilled in the art from the description which follows.

Broadly, the invention comprises formation of a water-resistant starch corrugating adhesive by addition of a urea-formaldehyde or melamine formaldehyde resin to a specific starch adhesive system.

The specific starch adhesive system is based on a new single starch component adhesive as provided in co-pending application Ser. No. 398,061, now U.S. Patent 3,355,-307, John J. Schoenberger and Raymond P. Citko, filed Sept. 21, 1964, entitled "Single Mix Starch Adhesive," wherein starch, alkali, and water are pre-reacted in proportions and under temperature conditions specified therein resulting in a single starch component adhesive having improved properties. Application Ser. No. 398,061, now U.S. Patent 3,355,307, is herewith incorporated by reference.

Suitable starches for use in the present adhesive composition include unmodified ungelatinized starcch such as corn starch, tapioca starch, milo starch, waxy maize starch, wheat starch, potato starch, and the like, and chemically modified ungelatinized starch such as oxidized starch, acid-modified starch, enzyme modified starch, chemically derivative starch, e.g. starch ethers and starch esters, and the like.

The ungelatinized starch is thermal-chemically treated with water, alkali, and heat, to produce a starch slurry having characteristics of partially swollen starch. In order to prevent over-treatment, the thermal-chemical treatment is terminated at an appropriate time by the addition of borax, alum, cold water, ice, acid material, etc. in essence, any chemical addition or physical process alteration which causes the characteristics of the reaction mixture to fall outside those required for swelling of starch is satisfactory for use as a reaction terminator.

The final adhesive composition prepared from a single ungelatinized starch component comprises a reaction mixture of starch, water, and alkali in combination with a resin component selected from the group consisting of ureau-formaldehyde and melamine-formaldehyde resin. The composition contains between about 10% and about 40% starch solids by weight and between about 2 parts and about 25 parts of resin component for every 100 parts of starch solids. The reaction to effect swelling of the starch is carried out at a temperature between 70° F. and 160° F. The temperature conditions are dependent upon the amount of alkali used. The greater the quantity of alkali, the lesser the required temperature to effect swelling of the starch. The pH of the composition is between about 8 and about 13. After the starch swelling action has been terminated, the gel point of the composition is adjusted to a temperature between about 135° F. and about 160° F. The Stein Hall viscosity of the final adhesive composition ranges between about 15 seconds and about 50 seconds.

The resin component which effects water-resistance may be added prior to the starch swelling reaction, during the reaction, or subsequent thereto. For ease of operation it is generally preferred to add the resin component at the time that the starch swelling reaction is terminated or shortly thereafter.

In the practice of the present invention it has been found preferable to use both alum and borax in the formulation to stop the reaction. The alum is effective as a reaction stopper and the borax provides additional tack to the adhesive composition. Heretofore it has been known that the quantity of borax used must be considerably diminished in an adhesive formulation or, in fact, eliminated altogether, if a urea-formaldehyde or like water-resistant agent is to be used. It is indeed surprising to find that the viscosity of the adhesive composition of the present invention is not substantially altered by the simultaneous use of a urea-formaldehyde constituent and borax.

The process and product paramters are summarized in Table 1 below.

Table 1

| | Broad Range | Preferred Range |
|---|---|---|
| Starch solids, percent by weight | 10–40 | 15–30 |
| pH | 8–13 | 11–12.5 |
| Resin component, dry basis (parts per 100 parts starch) | 2—25 | 6–12 |
| Reaction temperature, °F | 70–160 | 90–115 |
| Gel point, °F | 135–160 | 144–152 |
| S.H. viscosity, seconds | 15–50 | 17–25 |

In a typical example, corn starch is slurried in water to provide a slurry having a solids content of 20%. Sufficient alkali and heat are added to provide a pH between 11 and 12.5, and a temperature of approximately 100° F. The mixture is agitated and maintained at this temperature for about 15 minutes. After the thermal-chemical treatment, alum and borax are added in minor proportions along with about 9 parts of resin, dry basis, for every 100 parts of starch. The adhesive composition is then ready for use.

The composition may be maintained under agitation at a temperature in the range of 80–110° F. during operation without any substantial change in viscosity or other characteristics.

The invention will now be described in further detail by means of several exemplary demonstrations thereof.

In the examples, all viscosities are measured in a standard Stein Hall cup hereinafter referred to as S.H. viscosity. The caustic used in each example was sodium hydroxide. However, potassium hydroxide or other alkaline materials are equally satisfactory.

In order to determine the degree of water-resistance imparted to the finished board, a fiber pull test is conducted as follows. A single facer board is cut into two inch by five inch pieces with the flutes running across the narrow width. A liner board is cut into 2½ by 5½ inch pieces. The film applicator is set at 0.01 inch and a film of the adhesive to be tested is spread on a glass plate. The film is transferred to the flutes of the single facer board by pressing the latter against the film on the glass. The double backer liner is placed on the preheated hot plate and the single facer liner board with the adhesive on the flutes is placed on the double backer liner. To cure the corrugated board, a 14.5 pound weight having a flat surface of 3 by 6 inches is set on top. After the prescribed number of seconds (5, 10, or 15) have elapsed, the weight is quickly removed from the finished board. The board is then allowed to age at room temperature for either 24 hours or two weeks. After aging the board is completely immersed in water, having a temperature of 77° F., for a period of 24 hours. The board is then removed from the water and the double backer liner is pulled from the single facer. The amount of fiber pull is noted.

The curing step simulates different plant conditions by varying the time and/or temperature. For example, curing at 350° F. for 15 seconds represents slower machine speeds with better bonding conditions than 250° F. for 10 seconds. The ranges exemplified simulate most different plant conditions encountered in industry.

EXAMPLE 1

Unmodified, ungelatinized corn starch in the amount of 1,100 pounds was mixed to form a slurry with 427 gallons of water at 95° F. To this slurry was added a caustic preparation which had been prepared by combining 109 gallons of cold water with 5.6 gallons of a 50% liquid caustic solution. The caustic preparation was heated to a temperature of 130° F. before addition to the starch slurry. The temperature of the final mixture was maintained at 101° F. under agitation for about 15 to 20 minutes until the viscosity had reached 25 Stein Hall seconds.

At this point, 5 pounds of alum dissolved in 30 pounds of water was added and the mixture agitated for 2 minutes. Then borax in the amount of 24 pounds along with 220 pounds of commercial urea-formaldehyde resin (60% solids) was added. The mixture was mixed for 20 minutes at which time the solids content was 21.6. The Stein Hall viscosity during the 20 minutes agitation varied between 20 and 23 seconds. The final overall quantity of the adhesive paste was 670 gallons.

This paste was applied to corrugated board to produce double backer board. The board was allowed to age for 24 hours after which it was immersed in 77° F. water for 24 hours. After the 24 hour immersion the water-resistant characteristics were determined by attempting to separate the liners. Upon separation, it was found that 90–100% fiber failure occurred.

EXAMPLE 2

This example illustrates preparation of adhesive compositions having a wide range of starch solids levels. It may be noted that excellent water-resistant characteristics were imparted to the corrugated board at all starch solids levels.

The reaction and preparation conditions were approximately the same as those of Example 1.

Table 2

| | | |
|---|---|---|
| Water | gals | 536 |
| Caustic (50% water) | gals | 5.6 |
| Alum | lbs | 5 |
| Borax | lbs | 24 |
| Urea-formaldehyde resin (60% solids) | lbs | 165 |
| Cure temperature | °F | 350 |
| Cure time | seconds | 15 |

| | | | | |
|---|---|---|---|---|
| Starch, lbs | 1,100 | 1,300 | 1,500 | 1,800 |
| Percent starch solids | 19.4 | 22.9 | 25.5 | 30 |
| S.H. viscosity: | | | | |
| Initial | 21 | 23 | 21 | 22 |
| After resin | 21 | 21 | 20 | 23 |
| Percent fiber tear: | | | | |
| After 24 hours aging | 30 | 35 | 60 | 75 |
| After 2 weeks aging | 70 | 90 | 95 | 95 |

EXAMPLE 3

This example shows the effect of different amounts of resin on the water-resistant properties of corrugated board made with the adhesive of the following composition:

Table 3

| | | |
|---|---|---|
| Starch | lbs | 1100 |
| Water | gals | 536 |
| Caustic (50% water) | gals | 5.6 |
| Alum | lbs | 5 |
| Borax | lbs | 24 |
| Cure temperature | °F | 350 |
| Cure time | seconds | 15 |

| | | | | | |
|---|---|---|---|---|---|
| Urea-formaldehyde resin: | | | | | |
| At 60% solids, lbs | 77 | 110 | 165 | 220 | 275 |
| Dry basis, lbs | 46.2 | 66 | 99 | 132 | 165 |
| Parts/100 parts starch (dry basis) | 4.2 | 6 | 9 | 12 | 15 |
| S.H. viscosity: | | | | | |
| Initial | 22 | 22 | 22 | 22 | 22 |
| After resin | 22 | 22 | 22 | 23 | 24 |
| Percent fiber tear: | | | | | |
| After 24 hours aging | 5 | 15 | 30 | 50 | 60 |
| After 2 weeks aging | 10 | 30 | 70 | 90 | 95 |

EXAMPLE 4

In this example borax is added in different amounts. It should be noted that no substantial increase in viscosity is obtained when using a urea-formaldehyde resin in the presence of borax.

Table 4

| | | |
|---|---|---|
| Starch | lbs | 1100 |
| Water | gals | 536 |
| Caustic (50% water) | gals | 5.6 |
| Alum | lbs | 5 |
| Urea-formaldehyde resin (60 %solids) | lbs | 165 |
| Cure temperature | °F | 350 |
| Cure time | seconds | 15 |

| | | | | |
|---|---|---|---|---|
| Borax, lbs | 0 | 12 | 24 | 36 |
| S.H. viscosity: | | | | |
| Initial | 21 | 19 | 19 | 20 |
| After resin | 19 | 20 | 22 | 23 |
| Percent fiber tear: | | | | |
| After 24 hours aging | 10 | 15 | 25 | 50 |
| After 2 weeks aging | 40 | 50 | 75 | 90 |

EXAMPLE 5

This example illustrates an advantage of the present invention related to viscosity. The advantage is operability over a wide range of viscosity values in preparation and application of the adhesive without impairing the bond and water-resistant properties of the corrugated board. The adhesive composition of Table 5 were prepared in the same manner as those of Example 1 except that the different viscosities were obtained by manipulating the temperature and time of reaction. The ability to produce high quality corrugated board at a wide range of viscosity values permits adaptation to a large variety of industrial conditions.

Table 5

| | | |
|---|---|---|
| Starch | lbs | 1500 |
| Water | gals | 536 |
| Caustic (50% water) | gals | 5.9 |
| Alum | lbs | 5 |
| Borax | lbs | 24 |
| Urea-formaldehyde resin: | | |
| 60% dry substance | lbs | 300 |
| Parts dry basis/100 parts starch | parts | 12 |
| Cure temperature | °F | 350 |
| Cure time | seconds | 15 |

| | | | |
|---|---|---|---|
| S.H. Viscosity: | | | |
| Initial | 19 | 24 | 30 |
| After resin | 19 | 26 | 33 |
| Percent fiber tear: | | | |
| After 24 hours aging | 55 | 70 | 60 |
| After 2 weeks aging | 90 | 95 | 90 |

EXAMPLE 6

As previously noted, the curing system permits laboratory evaluation of corrugated board under simulated plant conditions. This example presents data which demonstrate operability under a wide variety of plant conditions. For instance, a cure temperature of 250° F. for 10 seconds is substantially equivalent in bonding conditions to running a commercial at a speed greater than 500 feet per minute. A cure temperature of 350° F. for 15 seconds approximates a machine speed of 250 feet per minute. Thus, these data support operability under substantially all plant and machine conditions. The adhesive composition was prepared in the same manner as that of Example 1.

Table 6

| | | |
|---|---|---|
| Starch | lbs | 1100 |
| Water | gals | 536 |
| Caustic (50% water) | gals | 5.6 |
| Alum | lbs | 5 |
| Borax | lbs | 24 |
| Urea-formaldehyde resin (60% solids) | lbs | 165 |

| Cure temperature, °F. | 250 | | | 300 | | | 350 | | |
|---|---|---|---|---|---|---|---|---|---|
| Cure time, seconds | 5 | 10 | 15 | 5 | 10 | 15 | 5 | 10 | 15 |
| Percent fiber tear: | | | | | | | | | |
| After 24 hours aging | 0 | 5 | 10 | 10 | 15 | 20 | 15 | 20 | 30 |
| After 2 weeks aging | 5 | 35 | 40 | 20 | 40 | 50 | 30 | 50 | 70 |

EXAMPLE 7

This example illustrates the similarity between melamine formaldehyde resin and urea-formaldehyde resin in their ability to impart water-resistance to corrugated board in the single starch component system of this invention. The adhesives were prepared as in Example 1 and the water-resistant data are presented below in Table 7.

Table 7

| | | |
|---|---|---|
| Starch | lbs | 1100 |
| Water | gals | 536 |
| Caustic (50% water) | gals | 5.6 |
| Alum | lbs | 5 |
| Borax | lbs | 24 |
| Resin | lbs | 165 |
| Cure temperature | °F | 350 |
| Cure time | seconds | 15 |

| Resin | Urea-formaldehyde (60% solids) | Melamine formaldehyde (67% solids) |
|---|---|---|
| S.H. viscosity: | | |
| Initial | 22 | 22 |
| After resin | 22 | 23 |
| Percent fiber tear: | | |
| After 24 hours aging | 30 | 25 |
| After 2 weeks aging | 70 | 70 |

The attendant advantages of the present process and composition include:

(1) A simple process requiring inexpensive readily available components for producing a corrugating adhesive having superior water-resistant properties.

(2) A single starch component adhesive composition suitable for use at all commercial machine speeds to produce a water-resistant corrugated board.

(3) An adhesive composition containing starch, borax, and urea-formaldehyde, or melamine formaldehyde resin, which when stored prior to use under conventional corrugating plant conditions does not change substantially in viscosity.

We claim:

1. A composition suitable for use as a corrugating adhesive which comprises an adhesive formulation prepared from a single ungelatinized starch component which adhesive formulation consists of a reaction mixture of partially swollen starch, water, alkali, and a resin component selected from a group consisting of urea formaldehyde resin and melamine formaldehyde resin, in proportions such that the composition contains from about 10% to about 40% starch solids by weight, from about 2 parts to about 25 parts of resin component for every 100 parts of starch solids, the pH of the reaction mixture is in the range from about 13 to about 8, the gel point is in the range from about 135° F. to about 160° F., and the Stein Hall viscosity is in the range from about 15 seconds to about 50 seconds.

2. The composition of claim 1 wherein the solids content is between about 12% and about 30%, the pH is between about 11 and about 12.5, and the gel point is between about 144° F. and about 152° F.

3. The composition of claim 1 wherein the resin component is urea-formaldehyde resin.

4. The adhesive composition of claim 1 wherein the resin component is melamine formaldehyde resin.

5. The adhesive composition of claim 1 wherein the resin component is present in an amount between about 6 parts and about 12 parts for each 100 parts of starch.

6. The adhesive composition of claim 1 wherein the starch is unmodified ungelatinized corn starch.

7. The composition of claim 23 wherein the resin component is urea-formaldehyde resin.

8. The composition of claim 23 wherein the resin component is melamine formaldehyde resin.

9. A process for preparing a corrugating adhesive capable of imparting water-resistance to corrugated board which comprises:
(a) preparing a mixture of ungelatinized starch, water, and alkali in amounts such that the mixture contains between about 10% and about 40% starch solids by weight,
(b) reacting the mixture at a pH between about 13 and about 8, and at a temperature between about 70° F. and about 160° F.,
(c) terminating the reaction,
(d) adjusting the gel point to between about 135° F. and about 160° F., and
(e) adding a resin component selected from the group consisting of urea-formaldehyde resin and melamine formaldehyde resin in an amount of about 2 parts to about 25 parts for every 100 parts of starch.

10. A process as in claim 9 wherein the solids content is between about 20% and about 30% and the pH of the slurry is between about 11 and about 12.5, and the reaction temperature is between about 100° F. and about 125° F.

11. A process as in claim 9 wherein the resin component is urea-formaldehyde resin.

12. A process as in claim 9 wherein the resin component is melamine formaldehyde resin.

13. The process of claim 11 wherein the urea-formaldehyde resin is present in an amount between about 6 and about 12 parts for every 100 parts of starch.

14. The process of claim 12 wherein the melamine formaldehyde resin is present in an amount between about 6 and about 12 parts for every parts of starch.

15. The process of claim 9 wherein steps c and d are effected by the addition of a minor proportion of alum and borax.

16. A process for preparing a corrugating adhesive capable of imparting water-resistance to corrugated board which comprises:
(a) preparing a mixture of ungelatinized starch, water, alkali and a resin component containing between about 10% and about 40% starch solids by weight, and between about 2 parts and about 25 parts, for every 100 parts of starch, of a resin component selected from the group consisting of urea-formaldehyde resin and melamine formaldehyde resin,
(b) reacting the mixture at a pH between about 13 and about 10, and at a temperature between about 70° F. and about 160° F.,
(c) terminating the reaction, and
(d) adjusting the gel point to between about 135° F. and about 160° F.

17. The process of claim 16 wherein the resin component is urea-formaldehyde.

18. A process as in claim 16 wherein the resin component is melamine formaldehyde resin.

19. The process of claim 17 wherein the solids content is between about 20% and about 30%, the pH is between about 12.5 and about 11, and the reaction temperature is between about 100° F. and about 125° F.

20. A process for preparing a corrugating adhesive capable of imparting water-resistance to corrugated board, which comprises:
(a) preparing a mixture of ungelatinized starch, water, and alkali containing between about 20% and about 30% starch solids by weight,
(b) reacting the mixture at a pH between about 12.5 and about 11, and at a temperature between about 70° F. and about 160° F.,
(c) terminating the reaction,
(d) adjusting the gel point to between about 144° F. and about 152° F., and
(e) adding a resin component selected from the group consisting of urea-formaldehyde resin and melamine formaldehyde resin in an amount of about 6 parts to about 12 parts for every 100 parts of starch.

21. A process as in claim 20 wherein the resin component is urea-formaldehyde resin.

22. A process as in claim 20 wherein the resin component is melamine formaldehyde resin.

23. A composition suitable for use as a corrugating adhesive which comprises an adhesive formulation prepared from a single ungelatinized starch component which adhesive formulation consists of a reaction mixture of partially swollen starch, water, alkali, and a resin component selected from the group consisting of urea formaldehyde resin and melamine formaldehyde resin in proportions such that the composition contains from about 20% to about 30% starch solids by weight, from about 6 parts to about 12 parts of resin component for every 100 parts of starch solids, the pH of the reaction mixture is in the range from about 12.5 to about 11, the gel point is in the range from about 144° F. to about 152° F., and the Stein Hall viscosity is in the range from about 17 seconds to about 25 seconds.

(References on following page)

References Cited

UNITED STATES PATENTS

| | | |
|---|---|---|
| 2,466,172 | 4/1949 | Kesler et al. |
| 2,610,136 | 9/1952 | Casey et al. |
| 2,626,934 | 1/1953 | Kesler. |
| 2,838,465 | 6/1958 | Porowski. |

WILLIAM H. SHORT, Primary Examiner

E. WOODBERRY, Assistant Examiner

U.S. Cl. X.R.

161—263